United States Patent
Wu et al.

(10) Patent No.: US 6,911,413 B2
(45) Date of Patent: Jun. 28, 2005

(54) NANO-GOLD CATALYST AND PROCESS FOR PREPARING THE SAME

(75) Inventors: Kuo-Ching Wu, Hsinchu (TW); Yu-Lan Tung, Hsinchu (TW); Chu-Chang Dai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 191 days.

(21) Appl. No.: 10/461,434

(22) Filed: Jun. 16, 2003

(65) Prior Publication Data

US 2004/0127353 A1 Jul. 1, 2004

(30) Foreign Application Priority Data

Dec. 31, 2002 (TW) ........................................ 91138165 A

(51) Int. Cl.[7] .............................................. B01J 23/52
(52) U.S. Cl. ...................... 502/344; 502/350; 502/330; 502/338; 502/337; 502/349
(58) Field of Search ................................ 502/344, 350, 502/330, 338, 337, 349

(56) References Cited

U.S. PATENT DOCUMENTS

| | | | | | |
|---|---|---|---|---|---|
| 5,623,090 | A | * | 4/1997 | Haruta et al. | 568/360 |
| 6,720,284 | B1 | * | 4/2004 | Plzak | 502/330 |
| 6,825,366 | B2 | * | 11/2004 | Cunningham et al. | 549/533 |
| 2003/0060655 | A1 | * | 3/2003 | Hayashi et al. | 560/238 |
| 2003/0092921 | A1 | * | 5/2003 | Stangland et al. | 549/533 |

* cited by examiner

*Primary Examiner*—Christina Johnson
(74) *Attorney, Agent, or Firm*—Bacon & Thomas PLLC

(57) ABSTRACT

The present invention discloses a nano-gold catalyst including a solid carrier and gold deposited on the carrier, wherein the deposited gold has a size less than 10 nm, and the carrier is a mixed metal hydroxide and oxide having the following formula:

$$M(OH)_q O_y$$

Wherein M is Ti, Fe, Co, Zr, or Ni; q is 0.1–1.5; and $q+2y=z$, wherein z is the valence of M. The present invention also discloses a preparation process of the nano-gold catalyst.

27 Claims, No Drawings

NANO-GOLD CATALYST AND PROCESS FOR PREPARING THE SAME

FIELD OF THE INVENTION

The present invention relates to a nano-gold catalyst and a process for preparing the same; and particularly to a nano-gold catalyst capable of oxidizing carbon monoxide at room temperature and a process for preparing the same.

BACKGROUND OF THE INVENTION

Gold is a highly stable metal without any catalyst activity. When the size of a gold particle is smaller than 10 nm, gold exhibits a unique room temperature activity due to metastable interatomic bonding of gold atoms. A nano-gold catalyst has the following three features: fast reaction rate, high selectivity, and low reaction temperature.

Applications of a nano-gold catalyst include:

(1) Oxidation of Carbon Monoxide at Room Temperature

The oxidation reaction of carbon monoxide at room temperature is a best showcase reaction for a nano-gold catalyst. At present, only a nano-gold catalyst has the capability of oxidizing carbon monoxide at room temperature. The prerequisite for an active gold catalyst is the particle size of gold needs to be less than 10 nm, with an optimum catalyst particle size of <5 nm. Another factor affecting the activity of a gold catalyst is a strong metal-support interaction (SMSI) between gold and a support. The support is preferably selected from p-type and n-type semiconductor metal oxides. Available supports include: $TiO_2$, $Fe_2O_3$, $Co_3O_4$ and NiO, etc.

At present, although a gold catalyst can be synthesized to have a particle size less than 10 nm and posses a high activity in oxidizing carbon monoxide, it can not be commercialized due to a short lifetime and the catalytic efficiency of the catalyst. The factors affecting the lifetime of the catalyst include: an insufficient interaction between gold particles and the support. The melting point of a gold catalyst with a particle size of 5 nm is drastically reduced from the original 1337K to 700K. As a result, the gold catalyst is liable of sintering along with the progress of the reaction. And the catalyst will lose its activity when the particle size of the catalyst grows beyond 10 nm.

(2) Selective Oxidation Reaction of Hydrocarbons

The selective oxidation of hydrocarbons and aromatic hydrocarbons is an important technology for producing key intermediate materials in chemical engineering processes, e.g. preparation of an alcohol from an alkane, preparation of an epoxide from an alkene, and preparation of a hydroxyl aromatic hydrocarbon from an aromatic hydrocarbon, etc. Most of the above-mentioned processes adopt a liquid phase oxidation reaction system, which uses hydrogen peroxide as an oxidizing agent. A gas phase oxidation process cannot compete with a liquid phase oxidation process due to a poor selectivity. However, this situation is changed due to the emergence of the nano-gold catalyst. The selectivity of product for some processes can exceed 90 mol % and molecular oxygen can be used as an oxidizing agent. Even though the results are encouraging, improvements are required due to a low yield per unit catalyst. The related prior arts are listed in the following:

| Type of reaction | Catalyst | Selectivity | Conversion | Yield | Ref. |
|---|---|---|---|---|---|
| methanol → formaldehyde | Au gauze | 100 | 100 | 100 | 1) |
| propylene → PO | $Au-TiO_2/SiO_2$ | 93 | 2.6 | — | 2) |
| isobutane → t-butanol | $Au-TiO_2/SiO_2$ | 85 | 1.0 | — | 2) |

1) C. N. Hodges and L. C. Roselaar, J. Appl. Chem. Biotechnol. 25 (1975) p609
2) T. Hayashi and M. Haruta, Shokubai, 37 (1995) p75

(3) Use of Nano-gold Catalyst in Other Chemical Reactions:

| Type of reaction | Catalyst | Ref. |
|---|---|---|
| Butadiene → butene | $Au/Al_2O_3$ | 2) |
| Acetone → isopropanol | Au films | 3) |
| $CO + H_2$ → methanol | $Au/ZnO$, $Au/ZnFe_2O_4$ | 4) |
| $CO + H_2O$ → H2 | $Au/Fe_2O_3$ | 5) |
| $NO + H_2$ → $N_2$ or $NH_3$ | Au/MgO | 6) |
| $NO + CO$ → $N_2$ or $N_2O$ | $Au/Fe_2O_3$, $Au/NiFe_2O_4$ | 7) |
| NO + hydrocarbon → N2 | $Au/ZnO$, $Au/Al_2O_3$ | 8) |

2) T. Hayashi and M. Haruta, Shokubai, 37 (1995) p75
3) C. T. H. Stoddat and C. Kemball, J. Colloid Sci., 11 (1956) p633
4) H. Sakurai and M. Haruta, Catal. Today, 29 (1996) p361
5) D. Andreeva, T. Tabakova, V. Idakiev, P. Christov, and R. Giovanoli, Appl. Catal. A:, 169 (1998) p9
6) S. Galvagno and G. Parravano, J. Catal., 55(1978) p178
7) M. Haruta, Catal. Today, 36(1996) p153
8) A. Ueda, T. Ohshima, and M. Haruta, Appl. Catal. B:, 12 (1997) p81

WO 00/09259 (CA 246882A1) discloses a $Au/Fe_2O_3$ catalyst suitable for CO selective oxidation in a reforming gas. Said catalyst is prepared by depositing a gold cluster with a diameter less than 4.5 nm on a granular $Fe_2O_3$ catalyst support. A method for preparing said catalyst comprises: (a) reacting a water soluble Fe(III) salt with an alkaline in an aqueous medium; (b) immersing a wet hydroxide gel thus obtained in an aqueous solution of a water soluble gold compound in order to deposit a complex gold cluster on the surface of the hydroxide gel; (c) removing water from the obtained reaction product suspension; and (d) calcining the resulting dry reaction product at 350–700° C. Although said prior art catalyst can selectively oxidize CO in a reforming gas, its CO oxidation activity at room temperature is still too low.

SUMMARY OF THE INVENTION

A main objective of the present invention is to provide a novel gold catalyst, and particularly a nano-gold catalyst with a novel carrier.

Another objective of the present invention is to provide a process for preparing a new nano-gold catalyst.

In order accomplish the aforesaid objectives of the present invention, a nano-gold catalyst synthesized according to the present invention comprises a solid carrier and gold deposited on the carrier, wherein the deposited gold has a size less than 10 nm, and the carrier comprises a mixed metal hydroxide and oxide having the following formula:

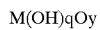

Wherein M is Ti, Fe, Co, Zr, or Ni; q is 0.1–1.5; and q+2y=z, wherein z is the valence of M.

Preferably, said carrier is composed of said mixture of metal hydroxide oxide, and said carrier is particulate having a specific surface area of 150–300 $m^2/g$.

Preferably, q is 0.5–1.5 and M is Ti, Fe(III) or Co.

Preferably, said deposited gold has a particle size smaller than 5 nm.

The present invention also discloses a process for preparing a nano-gold catalyst, which comprises the following steps:

a) preparing a M(OH)x solid carrier with a specific surface area larger than 150 m²/g, wherein M is Ti, Fe, Co, Zr, or Ni, and x is 2–4;

b) preparing an acidic gold precursor solution;

c) mixing said M(OH)x solid carrier with said acidic gold precursor solution, and controlling pH value of the resulting mixture to be basic, so that gold is deposited on said M(OH)x solid carrier to form a M(OH)x carrier deposited with gold, abbreviated as Au/M(OH)x; and d) partially oxidizing said Au/M(OH)x to form a nano-gold catalyst comprising a mixed metal hydroxide and oxide carrier having the following formula and gold deposited on said carrier:

$$M(OH)qOy$$

wherein M is defined as above; q is 0.1–1.5; and q+2y=z, wherein z is the valence of M.

Preferably, said partial oxidation in step d) comprises:

d1) performing a solid/liquid separation on the mixture resulting from step c) and drying the resulting Au/M(OH)x; and d2) calcining the dried Au/M(OH)x.

Preferably, said calcining in step d2) is carried out at 100° C.–500° C. for 0.5–4 hours, and more preferably, said calcining in step d2) is carried out at 150–250° C. for 2 hours.

Preferably, said partial oxidation in step d) comprises:

d0) adding an oxidation agent into the mixture resulting from step c) to perform an oxidation reaction; and d1') performing a solid/liquid separation on the reaction mixture resulting from step d0), and drying the resulting solid. More preferably, said partial oxidation in step d) further comprises:

d2) calcining the dried solid obtained from step d1').

Preferably, said oxidation agent in step d0) is a strong acid such that, after the addition of said strong acid, the resulting reaction mixture has a pH value of 0.5–4. More preferably, said strong acid is nitric acid.

Preferably, said oxidation reaction in step d0) is carried out at 40° C.–100° C. for 1–8 hours.

Preferably, said solid carrier in step a) is Ti(OH)₄.

Preferably, said step b) comprises dissolving HAuCl₄ or AuCl₃ in a solvent. More preferably, said solvent is ethanol or water.

Alternatively, said step b) comprises dissolving solid gold in a mixed solvent of HCl and HNO₃. Preferably, said mixed solvent is a mixture of 12 N HCl aqueous solution and 70% HNO₃ aqueous solution with a volume ratio of 2 N HCl aqueous solution: 70% HNO₃ aqueous solution=50:17.

Preferably, said pH value of the resulting mixture to be basic in step c) is 7.1–12.

Preferably, said mixing in step c) comprises: dispersing said solid carrier in water; dripping said acidic gold precursor solution into the resulting solid carrier aqueous dispersion while stirring; and dripping an alkaline solution into the aqueous dispersion concurrently with said acidic gold precursor solution, if said aqueous dispersion is acidic, and no need of adding an alkaline solution, if said aqueous dispersion is basic.

Preferably, said solid carrier aqueous dispersion has a pH value of 8–12, and said acidic gold precursor solution has a pH value of 0–4.

Preferably, said solid carrier in step a) is Fe(OH)₃, and NH₄(OH) is used as said alkaline solution to be dripped into said aqueous dispersion.

Preferably, said solid carrier in step a) is Co(OH)₂, and NH₄(OH) is used as said alkaline solution to be dripped into said aqueous dispersion.

Preferably, said solid carrier in step a) is Ti(OH)₄, and no alkaline solution is dripped into said aqueous dispersion.

Preferably, said solid carrier in step a) has a particle size of 10–50 nm, and has a specific surface area of 150–300 m²/g.

Preferably, q is 0.5–1.5 and M is Ti, Fe(III) or Co in step d).

Preferably, said nano-gold catalyst formed in step (d) comprises gold with a particle size smaller than 5 nm.

A nano-gold catalyst according to the present invention at least is known to have an excellent CO oxidation activity and an excellent catalyst lifetime at room temperature. Moreover, said CO oxidation activity and catalyst lifetime are substantially not affected by the presence of moisture and a high concentration of CO₂.

DETAILED DESCRIPTION OF THE INVENTION

A gold catalyst having a gold particle size <5 nm on a special carrier synthesized according to the present invention has the capability of completely converting 0~10,000 ppm CO at room temperature (where the gas spatial velocity (GHSV) can reach 300,000 hr⁻¹). Such a nano-gold catalyst has passed tests regarding the lifetime of a catalyst, moisture resistance, and resistance to high concentration of CO₂. In a reaction system using the invented catalyst, after 100 hours of continuous reaction, the concentration of CO in the effluent still remains at 0 ppm. The invented catalyst can be produced by using a conventional catalyst synthesis device at a relatively low cost, and thus has a high economic competitiveness.

The present invention will be further elaborated by way of the following examples, which are explanatory and not for limiting the scope of the present invention.

PREPARATION EXAMPLE 1

150 ml of TiCl₄ was dripped into 800 ml of dehydrated alcohol in a 2 L polypropylene beaker. The beaker was placed in an ice bath to maintain the temperature of the solution to be below 30° C. 700 ml of ethanol was placed in a 5 L polypropylene beaker and the beaker was placed in an ice bath to maintain the temperature of the solution to be below 30° C. The above prepared lemon yellow solution of TiCl₄/dehydrated alcohol was dripped into the ethanol under agitation, meanwhile 80% of ammonia solution (483 ml) was dripped in to control the pH value of the mixture in the beaker to be at 8. After completion of the dripping, the agitation was continued for two hours. The resulting mixture was filtered, and the filtration cake was washed with deionized water to remove the chlorine ions contained therein until the wash filtrate no longer formed a white precipitation when 0.1 N silver nitrate was used for titration. Next, the filtration cake was dried at 110° C. to obtain 117 g of a white dry Ti(OH)₄ carrier.

PREPARATION EXAMPLE 2

150 ml of TiCl₄ was dripped into 800 ml of deionized water in a 2 L polypropylene beaker. The beaker was placed in an ice bath to maintain the temperature of the solution to be below 30° C. 700 ml of deionized water was placed in a 5 L polypropylene beaker and the beaker was placed in an ice bath to maintain the temperature of the solution to be below 30° C. The above prepared aqueous solution of $TiCl_4$ was dripped into deionized water under agitation, meanwhile 30% of ammonia solution (620 ml) was dripped in to control the pH value of the mixture in the beaker to be at 10. After completion of the dripping, the agitation was continued for two hours. The resulting mixture was filtered, and the filtration cake was washed with deionized water to remove the chlorine ions contained therein until the wash filtrate no longer formed a white precipitation when 0.1 N silver nitrate was used for titration. Next, the filtration cake was dried at 110° C. to obtain 116 g of a white dry $Ti(OH)_4$ carrier.

PREPARATION EXAMPLE 3

270.5 g of $FeCl_3.6H_2O$ was added into 1500 ml of water in a 5 L polypropylene beaker. The mixture was dissolved under agitation. 2750 ml of 30% ammonia solution was dripped into the solution in the beaker under agitation. After completion of the dripping, the agitation was continued for two hours, meanwhile a 30% ammonia solution was dripped into the solution to control the final pH value of the solution to be at 10. The obtained mixture was filtered, and the filtration cake was washed with deionized water to remove the chlorine ions contained therein until the wash filtrate no longer formed a white precipitation when 0.1N silver nitrate was used for titration. Next, the filtration cake was dried at 110° C. to obtain 77 g of a chocolate-colored dry $Fe(OH)_3$ carrier.

EXAMPLES 1~6

0.4 g $HAuCl_4$ was dissolved in 100 ml of ethanol. The resulting solution was dripped into a dispersion formed by 20 g of the $Ti(OH)_4$ prepared in Preparation Example 1 and 100 ml of water. The resulting mixture was placed still overnight and then filtered. The resulting filtration cake was washed with 100 ml of ethanol, and then dried in vacuum to form 20 g of a gold catalyst semi-product (abbreviated as 1% $Au/Ti(OH)_4$). Gold catalysts were obtained by separately calcining 1 g of the gold catalyst semi-product at 300, 400, 450, and 500° C. The CO oxidation performance of said gold catalysts to a CO-containing air is in Table 1.

TABLE 1

| Example | Calcining temp. (° C.) | Air flow (ml/min) | Space velocity (1/hr) | Inlet temp. (° C.) | Inlet CO conc. (ppm) | CO conversion (%) |
|---|---|---|---|---|---|---|
| 1 | 300 | 500 | 30,000 | 136 | 10,000 | 80 |
| 2 | 400 | 500 | 30,000 | 66 | 10,000 | 80 |
| 3 | 450 | 500 | 30,000 | 54 | 10,000 | 80 |
| 4 | 500 | 500 | 30,000 | 70 | 10,000 | 80 |
| 5 | 450 | 500 | 30,000 | 44 | 30,000 | 80 |
| 6 | 450 | 500 | 30,000 | 35 | 50,000 | 80 |

EXAMPLES 7~12

The procedures in Example 1 were repeated to prepare a gold catalyst intermediate except that the amount of $HAuCl_4$ was changed to 0.8 g (2% $Au/Ti(OH)_4$). 1 g of the gold catalyst semi-product was calcined at 450° C. for 4 hours to obtain a gold catalyst. Analysis showed that said gold catalyst had a composition of $Ti(OH)_{0.5-1}O_{1.75-1.5}$. The CO oxidation performance of said gold catalyst to a CO-containing air is shown in Table 2.

TABLE 2

| Example | Air flow (ml/min) | Space velocity (1/hr) | Inlet temp. (° C.) | Inlet CO conc. (ppm) | CO conversion (%) |
|---|---|---|---|---|---|
| 7 | 500 | 30,000 | 28 | 1,400 | 100 |
| 8 | 500 | 30,000 | 28 | 2,500 | 100 |
| 9 | 500 | 30,000 | 28 | 5,000 | 100 |
| 10 | 500 | 30,000 | 28 | 10,000 | 100 |
| 11 | 500 | 30,000 | 28 | 30,000 | 100 |
| 12 | 500 | 30,000 | 28 | 50,000 | 100 |

EXAMPLES 13~16

The procedures in Example 1 were repeated to prepare a gold catalyst intermediate, wherein the amounts of $HAuCl_4$ used were 0.4 g, 0.8 g, 1.2 g, and 2.0 g of $HAuCl_4$ to prepare gold catalyst semi-products (2%, 3% and 5% $Au/Ti(OH)_4$). 1 g of the gold catalyst semi-product was sintered at 450° C. for 4 hours to obtain a gold catalyst. The CO oxidation performance of said gold catalysts to a CO-containing air is shown in Table 3.

TABLE 3

| Example | Amount of gold deposited (%) | Air flow (ml/min) | Space velocity (1/hr) | Inlet temp. (° C.) | Inlet CO conc. (ppm) | CO conversion (%) |
|---|---|---|---|---|---|---|
| 13 | 1 | 500 | 30,000 | 65 | 10,000 | 100 |
| 14 | 2 | 500 | 30,000 | 28 | 10,000 | 100 |
| 15 | 3 | 500 | 30,000 | 256 | 10,000 | 100 |
| 16 | 5 | 500 | 30,000 | 141 | 10,000 | 100 |

EXAMPLE 17

0.4 g $HAuCl_4$ was dissolved in 100 ml of ethanol. The resulting solution was dripped into a dispersion formed by 20 g of the $Fe(OH)_3$ prepared in Preparation Example 3 and 100 ml of water. The resulting mixture was mixed for 2 hours and then filtered. The resulting filtration cake was washed with 100 ml of ethanol, and then dried at 120° C. to form 20 g of a gold catalyst semi-product (abbreviated as 1% $Au/Fe(OH)_3$) having a carrier of $Fe(OH)_3$. A gold catalyst was obtained by calcining 1 g of the gold catalyst semi-product at 300° C. for 4 hours. The CO oxidation performance of said gold catalyst to a CO-containing air is shown in Table 4.

EXAMPLE 18

0.8 g of $HAuCl_4$ was dissolved in 100 ml of deionized water. The resulting solution was dripped into a dispersion formed by 20 g of the $Fe(OH)_3$ carrier prepared in Preparation Example 3 and 100 ml of water. Meanwhile, 30% of ammonia solution was used to adjust the pH value of the mixture to 10. The resulting mixture was mixed for 2 hours and then filtered. The resulting filtration cake was washed with 100 ml of deionized water, and then dried at 120° C. to form 20 g of a gold catalyst semi-product (abbreviated as 2% $Au/Fe(OH)_3$) having a carrier of $Fe(OH)_3$. A gold catalyst was obtained by calcining 1 g of the gold catalyst semi-product at 300° C. for 4 hours. The CO oxidation performances of said gold catalyst to a CO-containing air is shown in Table 4.

TABLE 4

| Example | calcining temp. (° C.) | Air flow (ml/min) | Space velocity (1/hr) | Inlet temp. (° C.) | Inlet CO conc. (ppm) | CO conversion (%) |
|---|---|---|---|---|---|---|
| 17 | 300 | 500 | 30,000 | 203 | 10,000 | 100 |
| 18 | 300 | 500 | 30,000 | 28 | 10,000 | 100 |

EXAMPLES 19~20

0.8 g of $HAuCl_4$ was dissolved in 100 ml of deionized water. The resulting solution was dripped into a dispersion formed by 20 g of a cobalt hydroxide carrier ($Co(OH)_2$, ProChem, Inc, USA) and 100 ml of water. Meanwhile, 30% of ammonia solution was used to adjust the pH value of the mixture to 10. The resulting mixture was mixed for 2 hours and then filtered. The resulting filtration cake was washed with 100 ml of deionized water, and then dried at 120° C. to form 20 g of a gold catalyst semi-product (abbreviated as 2% $Au/Co(OH)_2$) having a carrier of $Co(OH)_2$. A gold catalyst was obtained by calcining 1 g of the gold catalyst semi-product at 200° C. for 4 hours. The CO oxidation performance of said gold catalyst to a CO-containing air is shown in Table 5.

TABLE 5

| Example | Air flow (ml/min) | Space velocity (1/hr) | Inlet temp. (° C.) | Inlet CO conc. (ppm) | CO conversion (%) |
|---|---|---|---|---|---|
| 19 | 3,500 | 210,000 | 25 | 2,500 | 100 |
| 20 | 2,000 | 120,000 | 31 | 10,000 | 100 |

EXAMPLES 21~24

1.2 g of $HAuCl_4$ was dissolved in 500 ml of deionized water. The resulting solution was dripped into a dispersion formed by 20 g of the $Fe(OH)_3$ carrier prepared in Preparation Example 3 and 100 ml of water. Meanwhile, 30% of ammonia solution was used to adjust the pH value of the mixture to 10. The resulting mixture was mixed for 2 hours and then filtered. The resulting filtration cake was washed with 100 ml of deionized water for three times, and then dried at 120° C. to form 20 g of a gold catalyst semi-product (abbreviated as 3% $Au/Fe(OH)_3$) having a carrier of $Fe(OH)_3$. A gold catalyst was obtained by calcining 1 g of the gold catalyst semi-product at 200° C. for 2 hours. Analysis showed that said gold catalyst had a composition of $Fe(OH)_{0.5-1.2}O_{1.25-0.9}$. The CO oxidation performance of said gold catalyst to a CO-containing air is shown in Table 6.

TABLE 6

| Example | Air flow (ml/min) | Space velocity (1/hr) | Inlet temp. (° C.) | Inlet CO conc. (ppm) | CO conversion (%) |
|---|---|---|---|---|---|
| 21 | 600 | 36,000 | 26.0 | 3,904 | 100 |
| 22 | 1,200 | 72,000 | 26.2 | 2,028 | 100 |
| 23 | 1,800 | 108,000 | 26.5 | 1,788 | 100 |
| 24 | 2,400 | 144,000 | 26.7 | 13,544 | 100 |

EXAMPLES 25~26

A test for resistance to saturated moisture was performed on the catalysts synthesized in Examples 21~24. A test CO/air mixture was introduced into an aeration bottle to saturate the mixture gas with moisture, and then the moisture saturated mixture gas was passed through a catalyst bed. The results are shown in Table 7.

TABLE 7

| Example | Reaction time (min) | Air flow (ml/min) | Space velocity (1/hr) | Inlet temp. (° C.) | Inlet CO conc. (ppm) | CO conversion (%) |
|---|---|---|---|---|---|---|
| 25 | 1 | 650 | 39,000 | 28.3 | 3,904 | 100 |
| 26 | 4380 | 650 | 39,000 | 31.7 | 3,904 | 100 |

EXAMPLES 27~33

A test of the influence of carbon dioxide on the catalysts synthesized in Examples 21~24 was carried out. Carbon dioxide at a concentration of 0~44% was introduced into a mixture of CO/air, and the resulting mixture was passed through a catalyst bed. The results are shown in Table 8.

TABLE 8

| Example | $CO_2$ conc. (%) | Air flow (ml/min) | Space velocity (1/hr) | Inlet temp. (° C.) | Inlet CO conc. (ppm) | CO conversion (%) |
|---|---|---|---|---|---|---|
| 27 | 0 | 1132 | 67,939 | 18.4 | 2,234 | 100 |
| 28 | 1.57 | 658 | 39,497 | 18.7 | 3,843 | 100 |
| 29 | 3.83 | 674 | 40,425 | 18.6 | 3,754 | 100 |
| 30 | 7.37 | 700 | 41,973 | 18.7 | 3,616 | 100 |
| 31 | 13.73 | 751 | 45,067 | 18.5 | 3,368 | 100 |
| 32 | 28.47 | 906 | 54,352 | 18.5 | 2,792 | 100 |
| 33 | 44.02 | 1158 | 69,454 | 18.5 | 2,185 | 99.95 |

EXAMPLE 34

A test on the lifetime of the catalysts synthesized in Examples 21~24 was carried out. A mixture of 9,316 ppm CO/air was introduced through a catalyst bed. After 8 hours of reaction, the system was shut down to its original state. The above test was repeated additional three times. The results of four tests are shown in Table 9.

TABLE 9

| Number of tests* | Air flow (ml/min) | Space velocity (1/hr) | Inlet temp. (° C.) | Inlet CO conc. (ppm) | CO conversion (%) |
|---|---|---|---|---|---|
| 1 | 1318 | 79,080 | 18.4 | 9,316 | 100 |
| 2 | 1318 | 79,080 | 18.7 | 9,316 | 100 |
| 3 | 1318 | 79,080 | 18.6 | 9,316 | 100 |
| 4 | 1318 | 79,080 | 18.7 | 9,316 | 100 |

*Each test was carried out continuously for 8 hours.

EXAMPLE 35

A test of the influence of saturated moisture on the lifetime of the catalyst synthesized in Examples 21~24 was carried out. A test CO/air mixture was introduced into an aeration bottle to saturate the mixture gas with moisture, and then the moisture saturated mixture gas was passed through a catalyst bed. The result is shown in Table 10.

TABLE 10

| Example | Reaction time (min) | Air flow (ml/min) | Space velocity (1/hr) | Inlet temp. (° C.) | Inlet CO conc. (ppm) | CO conversion (%) |
|---|---|---|---|---|---|---|
| 35 | 6,000 | 650 | 39,000 | 17.2 | 2,018 | 100 |

EXAMPLES 36~39

1.2 g of $HAuCl_4$ was dissolved in 100 ml of deionized water. The resulting solution was dripped into a dispersion formed by 20 g of the $Ti(OH)_4$ carrier prepared in Preparation Example 1 and 100 ml of water. After completion of the addition, 70% of nitric acid aqueous solution was used to adjust the pH value of the mixture to 2. The reaction was carried out at 60° C. for 6 hours. The reaction mixture was filtered. The resulting filtration cake was washed with 100 ml of deionized water three times, and then dried at 120° C. to form 20 g of a gold catalyst semi-product having a carrier of $Ti(OH)_{0.5-1}O_{1.75-1.5}$. A gold catalyst was obtained by calcining 1 g of the gold catalyst semi-product at 200° C. for 2 hours. The CO oxidation performance of said gold catalyst to CO-containing air is shown in Table 11.

TABLE 11

| Example | Air flow (ml/min) | Space velocity (1/hr) | Inlet temp. (° C.) | Inlet CO conc. (ppm) | CO conversion (%) |
|---|---|---|---|---|---|
| 36 | 5,459 | 327,500 | 30.0 | 2,500 | 99.96 |
| 37 | 5,709 | 342,500 | 30.0 | 5,000 | 99.96 |
| 38 | 5,984 | 359,000 | 30.5 | 7,500 | 100 |
| 39 | 6,290 | 377,000 | 30.6 | 10,000 | 100 |

EXAMPLES 40~44

20 g of the catalysts synthesized in Examples 21~24 were separately loaded in a round canister (diameter*height=7.25*0.48 cm). The CO oxidation performance of said loaded catalyst to CO-containing air is shown in Table 12.

TABLE 12

| Example | Air flow (ml/min) | Inlet CO concentration (ppm) | CO conversion (%) |
|---|---|---|---|
| 40 | 30,255 | 501 | 100.00 |
| 41 | 31,020 | 1956 | 99.08 |
| 42 | 31,530 | 2887 | 98.65 |
| 43 | 32,755 | 5005 | 97.32 |
| 44 | 34,336 | 7514 | 95.86 |

EXAMPLE 45

20 g of the catalyst synthesized in Examples 21~24 was subjected to the following activity tests:
Treatment of Waste Gas Having a High Concentration of Hydrogen at Room Temperature
For a gas having a composition of: $H_2$ 10%, and $O_2/H_2$ mole ratio: 1.4415, the conversion of hydrogen to water is 100% at GHSV=12,600 $hr^{-1}$.
Treatment of Ozone in Air at Room Temperature
For air containing 20~70 ppm $O_3$, the decomposition of $O_3$ is 100% at GHSV=20,000 $hr^{-1}$.

PREPARATION EXAMPLE 4

3.6 g of gold was dissolved in 67 ml of an aqueous solution (50 ml of 12 N HCl+17 ml of 70% $HNO_3$). The solution was diluted with water to form 500 ml of an acid aqueous solution containing gold ions.

EXAMPLES 46~49

500 ml of the acid aqueous solution containing gold ions prepared in Preparation Example 4 was dripped into a dispersion formed by 100 g of the $Fe(OH)_3$ carrier prepared in Preparation Example 3 and 500 ml of water. Meanwhile, 30% of ammonia solution was used to adjust the pH value of the mixture to 10. The mixture was mixed for 2 hours. The resulting mixture was filtered. The resulting filtration cake was washed with 500 ml of deionized water, and then dried at 120° C. to form 100 g of a gold catalyst semi-product (abbreviated as 3.6% $Au/Fe(OH)_3$) having a carrier of $Fe(OH)_3$. A gold catalyst was obtained by calcining 1 g of the catalyst semi-product at 180° C. for 2 hours. The CO oxidation performance of said gold catalyst to a CO-containing air is shown in Table 13.

TABLE 13

| Example | Air flow (ml/min) | Space velocity (1/hr) | Inlet temp. (° C.) | Inlet CO concentration (ppm) | CO conversion (%) |
|---|---|---|---|---|---|
| 46 | 4,620 | 277,200 | 21.9 | 2,500 | 100 |
| 47 | 4,840 | 290,400 | 21.9 | 5,000 | 100 |
| 48 | 5,060 | 303,600 | 22.3 | 7,500 | 100 |
| 49 | 5,320 | 319,200 | 23.4 | 10,000 | 100 |

EXAMPLE 50~59

0.2 of the catalyst synthesized in Examples 46~49 was subjected to the following activity tests. The CO oxidation performance of said gold catalyst to a CO-containing air at room temperature is shown in Table 14.

TABLE 14

| Example | Air flow (ml/min) | Space velocity (1/hr) | Inlet CO concentration (ppm) | CO conversion (%) |
|---|---|---|---|---|
| 50 | 2,148 | 644,300 | 1,000 | 100 |
| 51 | 2,302 | 690,600 | 1,000 | 99.80 |
| 52 | 2,454 | 735,600 | 2,500 | 100 |
| 53 | 2,762 | 827,700 | 2,500 | 99.96 |
| 54 | 1,840 | 549,900 | 5,000 | 100 |
| 55 | 2,148 | 642,000 | 5,000 | 99.96 |
| 56 | 1,432 | 429,100 | 7,500 | 100 |
| 57 | 1,656 | 490,200 | 7,500 | 99.93 |
| 58 | 1,534 | 457,400 | 10,000 | 100 |
| 59 | 1,686 | 502,800 | 10,000 | 99.96 |

What is claimed is:

1. A nano-gold catalyst comprising a solid carrier and gold deposited on the carrier, wherein the deposited gold has a size less than 10 nm, and the carrier comprises a mixed metal hydroxide and oxide having the following formula:

M(OH)qOy

Wherein M is Ti, Fe, Co, Zr, or Ni; q is 0.1–1.5; and q+2y=z, wherein z is the valence of M.

2. The nano-gold metal catalyst as claimed in claim 1, wherein said carrier is composed of said mixture of metal hydroxide oxide, and said carrier is particulate having a specific surface area of 150–300 $m^2/g$.

3. The nano-gold metal catalyst as claimed in claim 1, wherein q is 0.5–1.5 and M is Ti, Fe(III) or Co.

4. The nano-gold metal catalyst as claimed in claim 1, wherein said deposited gold has a particle size smaller than 5 nm.

5. A process for preparing a nano-gold catalyst, which comprises the following steps:

a) preparing a M(OH)x solid carrier with a specific surface area larger than 150 m$^2$/g, wherein M is Ti, Fe, Co, Zr, or Ni, and x is 2–4;

b) preparing an acidic gold precursor solution;

c) mixing said M(OH)x solid carrier with said acidic gold precursor solution, and controlling pH value of the resulting mixture to be basic, so that gold is deposited on said M(OH)x solid carrier to form a M(OH)x carrier deposited with gold, abbreviated as Au/M(OH)x; and d) partially oxidizing said Au/M(OH)x to form a nano-gold catalyst comprising a mixed metal hydroxide and oxide carrier having the following formula and gold deposited on said carrier:

$$M(OH)_qO_y$$

wherein M is defined as above; q is 0.1–1.5; and q+2y=z, wherein z is the valence of M.

6. The process as claimed in claim 5, wherein said partial oxidation in step d) comprises:

d1) performing a solid/liquid separation on the mixture resulting from step c) and drying the resulting Au/M(OH)x; and d2) calcining the dried Au/M(OH)x.

7. The process as claimed in claim 6, wherein said calcining in step d2) is carried out at 100° C.–500° C. for 0.5–4 hours.

8. The process as claimed in claim 7, wherein said calcining in step d2) is carried out at 150–250° C. for 2 hours.

9. The process as claimed in claim 5, wherein said partial oxidation in step d) comprises:

d0) adding an oxidation agent into the mixture resulting from step c) to perform an oxidation reaction; and d1') performing a solid/liquid separation on the reaction mixture resulting from step d0), and drying the resulting solid.

10. The process as claimed in claim 9, wherein said partial oxidation in step d) further comprises:

d2) calcining the dried solid obtained from step d1').

11. The process as claimed in claim 10, wherein said oxidation agent in step d0) is a strong acid such that, after the addition of said strong acid, the resulting reaction mixture has a pH value of 0.5–4.

12. The process as claimed in claim 11, wherein said oxidation reaction in step d0) is carried out at 40° C.–100° C. for 1–8 hours.

13. The process as claimed in claim 11, wherein said strong acid is nitric acid.

14. The process as claimed in claim 10, wherein said solid carrier in step a) is Ti(OH)$_4$.

15. The process as claimed in claim 5, wherein said step b) comprises dissolving HAuCl$_4$ or AuCl$_3$ in a solvent.

16. The process as claimed in claim 5, wherein said step b) comprises dissolving solid gold in a mixed solvent of HCl and HNO$_3$.

17. The process as claimed in claim 15, wherein said solvent is ethanol or water.

18. The process as claimed in claim 16, wherein said mixed solvent is a mixture of 12 N HCl aqueous solution and 70% HNO$_3$ aqueous solution with a volume ratio of 2 N HCl aqueous solution: 70% HNO$_3$ aqueous solution=50:17.

19. The process as claimed in claim 5, wherein said pH value of the resulting mixture to be basic in step c) is 7.1–12.

20. The process as claimed in claim 5, wherein said mixing in step c) comprises: dispersing said solid carrier in water; dripping said acidic gold precursor solution into the resulting solid carrier aqueous dispersion while stirring; and dripping an alkaline solution into the aqueous dispersion concurrently with said acidic gold precursor solution, if said aqueous dispersion is acidic, and no need of adding an alkaline solution, if said aqueous dispersion is basic.

21. The process as claimed in claim 20, wherein said solid carrier aqueous dispersion has a pH value of 8–12, and said acidic gold precursor solution has a pH value of 0–4.

22. The process as claimed in claim 20, wherein said solid carrier in step a) is Fe(OH)$_3$, and NH$_4$(OH) is used as said alkaline solution to be dripped into said aqueous dispersion.

23. The process as claimed in claim 20, wherein said solid carrier in step a) is Co(OH)$_2$, and NH$_4$(OH) is used as said alkaline solution to be dripped into said aqueous dispersion.

24. The process as claimed in claim 20, wherein said solid carrier in step a) is Ti(OH)$_4$, and no alkaline solution is dripped into said aqueous dispersion.

25. The process as claimed in claim 5, wherein said solid carrier in step a) has a particle size of 10–50 nm, and has a specific surface area of 150–300 m$^2$/g.

26. The process as claimed in claim 5, wherein q is 0.5–1.5 and M is Ti, Fe(III) or Co.

27. The process as claimed in claim 5, wherein said nano-gold catalyst formed in step d) comprises gold with a particle size smaller than 5 nm.

* * * * *